United States Patent
Halfmann et al.

(10) Patent No.: US 6,974,308 B2
(45) Date of Patent: Dec. 13, 2005

(54) HIGH EFFECTIVENESS COOLED TURBINE VANE OR BLADE

(75) Inventors: Steve H. Halfmann, Chandler, AZ (US); Yong W. Kim, San Diego, CA (US); Mark C. Morris, Phoenix, AZ (US); Milton Ortiz, Scottsdale, AZ (US); David R. Pack, Plantsville, CT (US); Craig A. Wilson, Mesa, AZ (US)

(73) Assignee: Honeywell International, Inc., Morristown, NJ (US)

( * ) Notice: Subject to any disclaimer, the term of this patent is extended or adjusted under 35 U.S.C. 154(b) by 558 days.

(21) Appl. No.: 09/992,250

(22) Filed: Nov. 14, 2001

(65) Prior Publication Data

US 2004/0076519 A1 Apr. 22, 2004

(51) Int. Cl.$^7$ ............................. F01D 5/16; F01D 9/06
(52) U.S. Cl. ................................ 416/97 R; 415/115
(58) Field of Search ............................ 415/115, 116; 416/96 R, 96 A, 97 R

(56) References Cited

U.S. PATENT DOCUMENTS

| | | | |
|---|---|---|---|
| 3,533,712 A | | 10/1970 | Kercher |
| 3,635,586 A | | 1/1972 | Kent et al. |
| 3,902,820 A | | 9/1975 | Amos |
| 4,224,011 A | | 9/1980 | Dodd et al. |
| 4,236,870 A | | 12/1980 | Hucul, Jr. et al. |
| 4,278,400 A | | 7/1981 | Yamarik et al. |
| 4,474,532 A | | 10/1984 | Pazder |
| 4,500,258 A | | 2/1985 | Dodd et al. |
| 4,514,144 A | | 4/1985 | Lee |
| 4,753,575 A | | 6/1988 | Levengood et al. |
| 4,767,268 A | | 8/1988 | Auxier et al. |
| 5,328,331 A | | 7/1994 | Bunker et al. |
| 5,403,159 A | | 4/1995 | Green et al. |
| 5,462,405 A | * | 10/1995 | Hoff et al. ............... 416/97 R |
| 5,545,003 A | | 8/1996 | O'Connor et al. |
| 5,558,497 A | | 9/1996 | Kraft et al. |

(Continued)

FOREIGN PATENT DOCUMENTS

| | | | |
|---|---|---|---|
| EP | 1065343 | 1/2001 | |
| GB | 800414 | 8/1956 | |
| GB | 1257041 A | * 12/1971 | ............... 416/96 R |
| JP | 6-137102 A | * 5/1994 | ............... 416/97 R |

OTHER PUBLICATIONS

International Search Report for PCT/US02/36199, dated Mar. 25, 2003.

*Primary Examiner*—Christopher Verdier
(74) *Attorney, Agent, or Firm*—Ingrassia Fisher & Lorenz

(57) ABSTRACT

A robust multiple-walled, multi-pass, high cooling effectiveness cooled turbine vane or blade designed for ease of manufacturability, minimizes cooling flows on highly loaded turbine rotors. The vane or blade design allows the turbine inlet temperature to increase over current technology levels while simultaneously reducing turbine cooling to low levels. A multi-wall cooling system is described, which meets the inherent conflict to maximize the flow area of the cooling passages while retaining the required section thickness to meet the structural requirements. Independent cooling circuits for the vane or blade's pressure and suction surfaces allow the cooling of the airfoil surfaces to be tailored to specific heat load distributions (that is, the pressure surface circuit is an independent forward flowing serpentine while the suction surface is an independent rearward flowing serpentine). The cooling air for the independent circuits is supplied through separate passages at the base of the vane or blade. The cooling air follows intricate passages to feed the serpentine thin outer wall passages, which incorporate pin fins, turbulators, etc. These passages, while satisfying the aero/thermal/stress requirements, are of a manufacturing configuration that may be cast with single crystal materials using conventional casting techniques.

39 Claims, 16 Drawing Sheets

U.S. PATENT DOCUMENTS

| | | |
|---|---|---|
| 5,591,007 A | 1/1997 | Lee et al. |
| 5,601,399 A | 2/1997 | Okpara et al. |
| 5,626,462 A | 5/1997 | Jackson et al. |
| 5,660,524 A | 8/1997 | Lee et al. |
| 5,702,232 A | 12/1997 | Moore |
| 5,772,397 A | 6/1998 | Morris et al. |
| 5,813,835 A | 9/1998 | Corsmeier et al. |
| 5,820,343 A | 10/1998 | Kraft et al. |
| 6,234,753 B1 * | 5/2001 | Lee ............................ 416/97 R |
| 6,254,334 B1 * | 7/2001 | LaFleur ....................... 415/115 |
| 6,481,966 B2 * | 11/2002 | Beeck et al. ............... 416/97 R |

* cited by examiner

HIGH EFFECTIVENESS COOLED TURBINE VANE OR BLADE

BACKGROUND OF THE INVENTION

The present invention generally relates to turbine vanes and blades and, more particularly, to high temperature turbine vanes and blades designed for high effectiveness cooling and ease of manufacture.

Gas turbine power plants are used as the primary propulsive power source for aircraft, in the forms of jet engines and turboprop engines, as auxiliary power sources for driving air compressors, hydraulic pumps, etc. on aircraft, and as stationary power supplies such as backup electrical generators for hospitals and the like. The same basic power generation principles apply for all of these types of gas turbine power plants. Compressed air is mixed with fuel and burned, and the expanding hot combustion gases are directed against stationary turbine vanes in the engine. The vanes turn the high velocity gas flow to impinge upon turbine blades mounted on a turbine disk or wheel that is free to rotate.

The force of the impinging gas causes the turbine disk to spin at high speed. Jet propulsion engines use this power to draw more air into the engine and then high velocity combustion gas is passed out the aft end of the gas turbine, creating forward thrust. Other engines use this power to turn a propeller or an electric generator.

The turbine vanes and blades lie at the heart of the power plant, and it is well established that, in most cases, they are one of the limiting factors in achieving improved power plant efficiency. In particular, because they are subjected to high heat and stress loadings as they are rotated and impacted by the hot gas, there is a continuing effort to identify improvements to the construction and/or design of turbine vanes and blades to achieve higher performance.

Modern aircraft jet engines have employed internal cooling of turbine vanes and blades to keep the vane and blade temperatures within design limits. Typically, the vanes and blades are cooled by air (typically bled from the engine's compressor) passing through longitudinally extending internal passages, with the air entering near the vane endwalls or blade root (the attached portion of the blade). Known turbine vane and blade cooling techniques include a cooling circuit consisting of series-connected longitudinally-oriented passages producing serpentine flow which increase cooling effectiveness by extending the length of the coolant flow path.

A plateau for high temperature turbine vanes and blades has slowed progress toward more efficient engines. A slowing of cooling effectiveness improvement has been reached wherein cooling air is fed to the inside of the turbine vane or blade to be exhausted through small passages over the vane or blade and through the trailing edge. A typical turbine vane or blade utilizing this prior art is shown in U.S. Pat. No. 5,813,835. The concept of a multi-walled turbine vane or blade has been discussed for many years with attempts proving to be extremely costly to fabricate.

U.S. Pat. No. 5,328,331 for Turbine Airfoil With Double Shell Outer Wall discloses a blade that is similar to the blade configuration of the present invention in that it does have an outer wall and an inner cooler wall, but the cooling scheme for this prior art blade differs significantly from the inventive blade. This prior art blade utilizes an impingement scheme that requires a plurality of impingement holes in the cool inner wall to distribute the cooling flow to the outer wall. In contrast, the present invention's vane or blade flow circuits do not require impingement holes or any cooling flow through the large center body core passage. In fact, it is not always desirable to have flow through the center body core cavity, because a no/low flow condition in the center body core means a very low heat transfer coefficient for the inner cool wall. This feature of the inventive vane and blade minimizes the thermal gradient between the inner and outer walls.

U.S. Pat. No. 5,813,835 for Air-Cooled Turbine Blade discloses multiple center cavities that are used for cooling. The inventive blade utilizes one large center cavity that does not require cooling air. Thus, the inventive structure is lighter because it does not have multiple ribs dividing it into multiple cavities. In addition, because the inventive blade does not require cooling air in the center body core, it can better tailor the thermal gradient between the outer hot walls and the inner cooler walls.

This prior art vane or blade does utilize multi-pass cooling passages on portions of the pressure and suction sides of the airfoil, yet several important differences relative to the inventive blade are noted. First, the forward portion of the '835 blade is cooled with conventional flow circuits that simultaneously cool the pressure and suction surfaces. This does not allow independent, optimized cooling for the pressure and suction sides in the forward region of the blade as does the inventive blade. The inventive blade utilizes a forward flowing pressure side circuit, which then is used to cool the leading edge cavity. Moreover, it utilizes an aft flowing suction side circuit that is also used to cool the tip of the blade and is then recycled to continue to cool the aft portions of the blade to maximize the thermal effectiveness of the blade. The multi-pass circuits disclosed in this prior art patent exit out film holes and do not continue to form the leading and trailing edge cooling circuits as does the inventive vane or blade. In addition, the pressure and central cavity cooling circuits in the '835 blade are not independent as are the inventive blade flow circuits. This is a feature of the present vane or blade invention making it producible as individually separate cores. This prior art disclosure makes no mention of special flow enhancements to the serpentine turns using turning vane and pin placement, nor does it mention any out of plane turning which the inventive blade aft bend utilizes. This prior art blade does not utilize a tip plenum cooling circuit nor does it recycle the tip cooling air. There is no mention of trip strips in the tip cooling region or any tip flag cooling enhancements. This prior art blade does use a trailing edge flow discharge, but there is no mention of special placement of pin fins upstream of the trailing edge teardrops for vorticity control and film cooling enhancement.

U.S. Pat. No. 5,626,462 for Double-Wall Airfoil discloses a multi-walled airfoil construction but its cooling configuration and manufacturing method and method of construction are very different from the inventive blade. This prior art blade requires an airfoil skin material that is deposited on the inner airfoil support wall to produce the cooling cavities. Unlike the inventive blade, which is integrally cast as a single piece to produce the cooling circuits, this prior art blade requires that the inner support structure be machined to create recessed grooves which can be made into cooling cavities later after the outer skin material is deposited. The '462 patent refers more to a method of construction of an airfoil structure than to a cooling configuration, which is described in vague generalities. This prior art blade cannot utilize cast pin fins (pedestals) or cast turning vanes in conjunction with pin fin placement for flow and heat transfer optimization in the flow channels as the inventive blade does, and it does not use tip cap cooling which gets recycled into the various cooling channels as does the inventive blade.

SUMMARY OF THE INVENTION

The present invention, referred to herein as High Effectiveness Turbine Heat Cooled Vane Or Blade, is a response to the challenge made to increase the efficiency of advanced gas turbine engines. This challenge was formally issued by the U.S. Government in 1989 as part of the Integrated High Performance Turbine Engine Technology (IHPTET) initiative to design a gas turbine engine with one half the specific fuel consumption of current gas generation engines.

The present invention provides a robust multiple-walled, multi-pass, high cooling effectiveness cooled turbine vane or blade designed for ease of manufacturability and for affordability. The purpose of this invention is to minimize cooling flows through highly loaded turbine rotors. It could also be used and retrofitted into current production engines. The inventive vane or blade design allows the turbine inlet temperature to increase by about 600° F. over conventional technology levels while simultaneously reducing turbine cooling to low levels that are not possible using the prior art. The reduction in cooling flow is equivalent to an improvement in specific fuel consumption of about 1.0% from this component alone.

The invention comprises a sophisticated multi-wall cooling system that meets the inherent conflict to maximize the flow area of the cooling passages while retaining the required section thickness to meet the structural requirements. A unique feature of the present invention is the independent cooling circuits for the blade's pressure and suction surfaces. This unique strategy allows the cooling of the airfoil surfaces to be tailored to specific heat load distributions (that is, the pressure surface circuit is a forward flowing serpentine while the suction surface is a rearward flowing serpentine). The cooling air for the independent circuits is supplied through separate passages at the base of the vane or blade that takes advantage of conventional manufacturing practices. The cooling air follows extremely intricate passages to feed the serpentine thin outer wall passages, which incorporate pin fins (commonly called pedistals), trip strips (commonly called turbulators), turning vanes, etc. These passages, while satisfying the aero/thermal/stress requirements, are of a manufacturing configuration that may be cast as a single piece using single crystal materials in conjunction with conventional casting techniques. Finding a solution for the conflicting requirements of both an acceptable aero/thermal/stress design and one that could actually be manufactured at an affordable cost by conventional methods is a significant advantage of the inventive turbine vane or blade design.

The features of the present invention are applicable to turbine blades and to turbine vanes. Although the term "blade" is used hereinafter, it will be understood that that term refers to both blades and vanes in the detailed description and in the appended claims.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
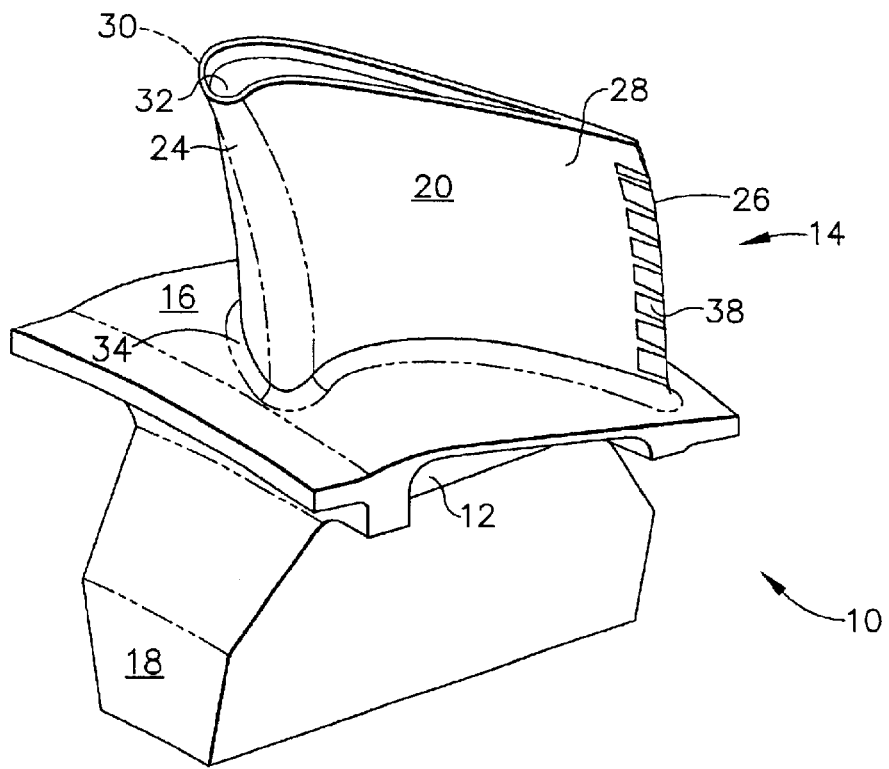
FIG. 1 is a perspective pressure (concave) side view of an engine turbine rotor blade that incorporates the airfoil of the blade of the invention.
Figure 2:
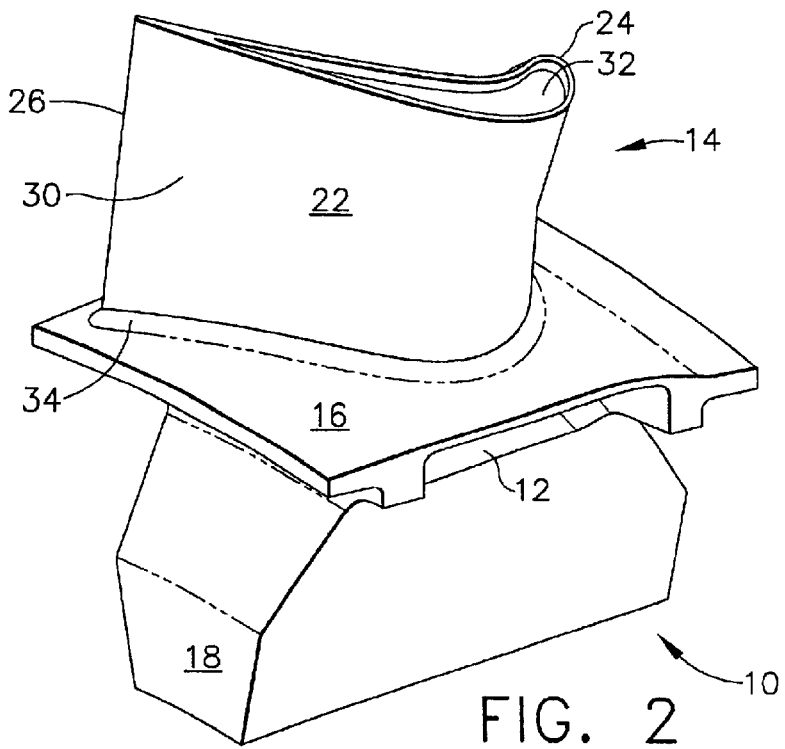
FIG. 2 is a second perspective suction (convex) side view of the engine turbine rotor blade of FIG. 1.
Figure 3:
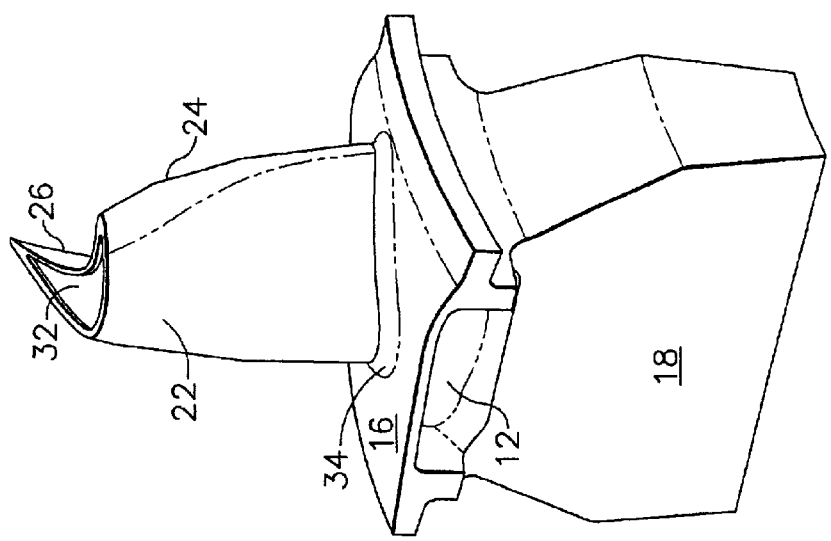
FIG. 3 is a third perspective leading edge view of the engine turbine rotor blade of FIG. 1.

FIGS. 1, 2 and 3 disclose an aircraft jet engine turbine rotor blade 10 that includes a shank 12 and the airfoil 14 of the invention. The shank 12 includes a platform 16, which helps to radially contain the turbine airflow, and a blade root area 18 where the dovetail (not shown) would be machined, which in the case of the blade attaches it to a turbine rotor disc (not shown). The airfoil blade 14 has a first outer wall 20 a second outer wall 22 together defining an airfoil shape including a leading edge 24, a trailing edge 26, a pressure side 28 along the first outer wall 20, a suction side 30 along the second outer wall 22, a blade tip 32, a pressure side discharge trailing edge slot 38, and an airfoil/platform fillet 34.

Figure 4:
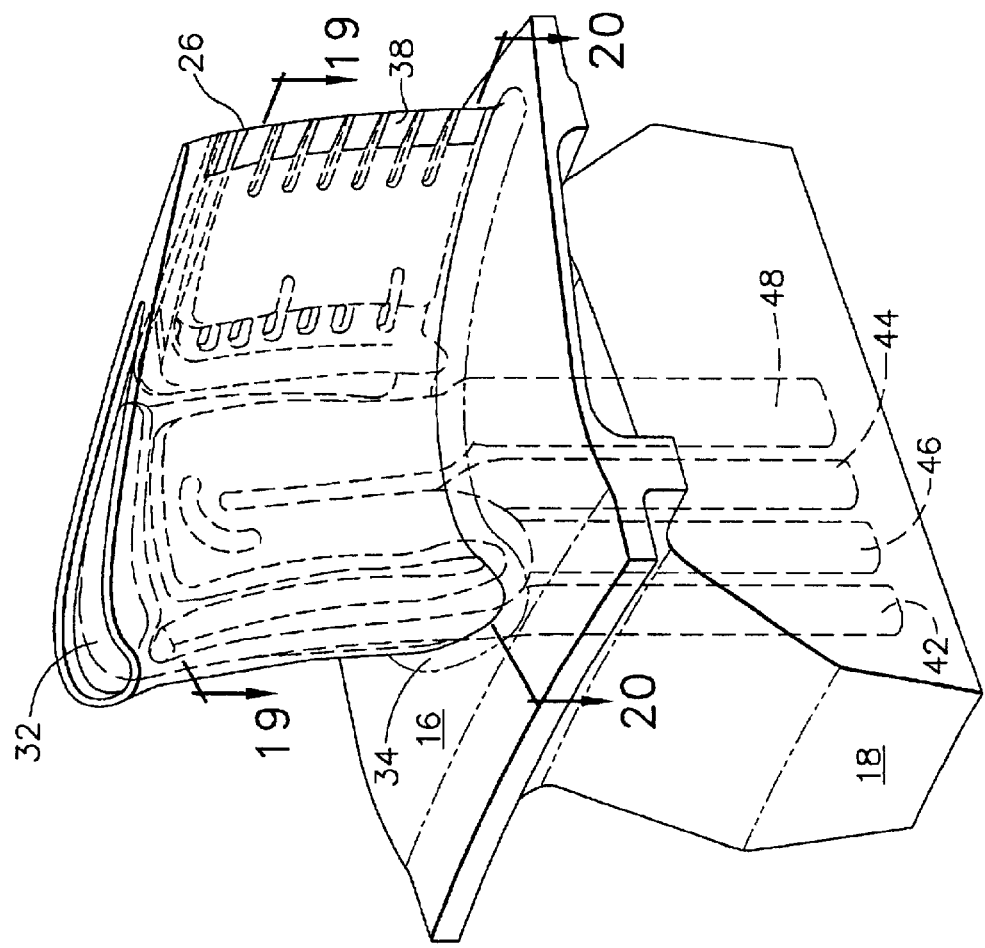
FIG. 4 is a cutaway perspective view of the blade showing the blade cooling circuits in dotted lines.
Figure 5:
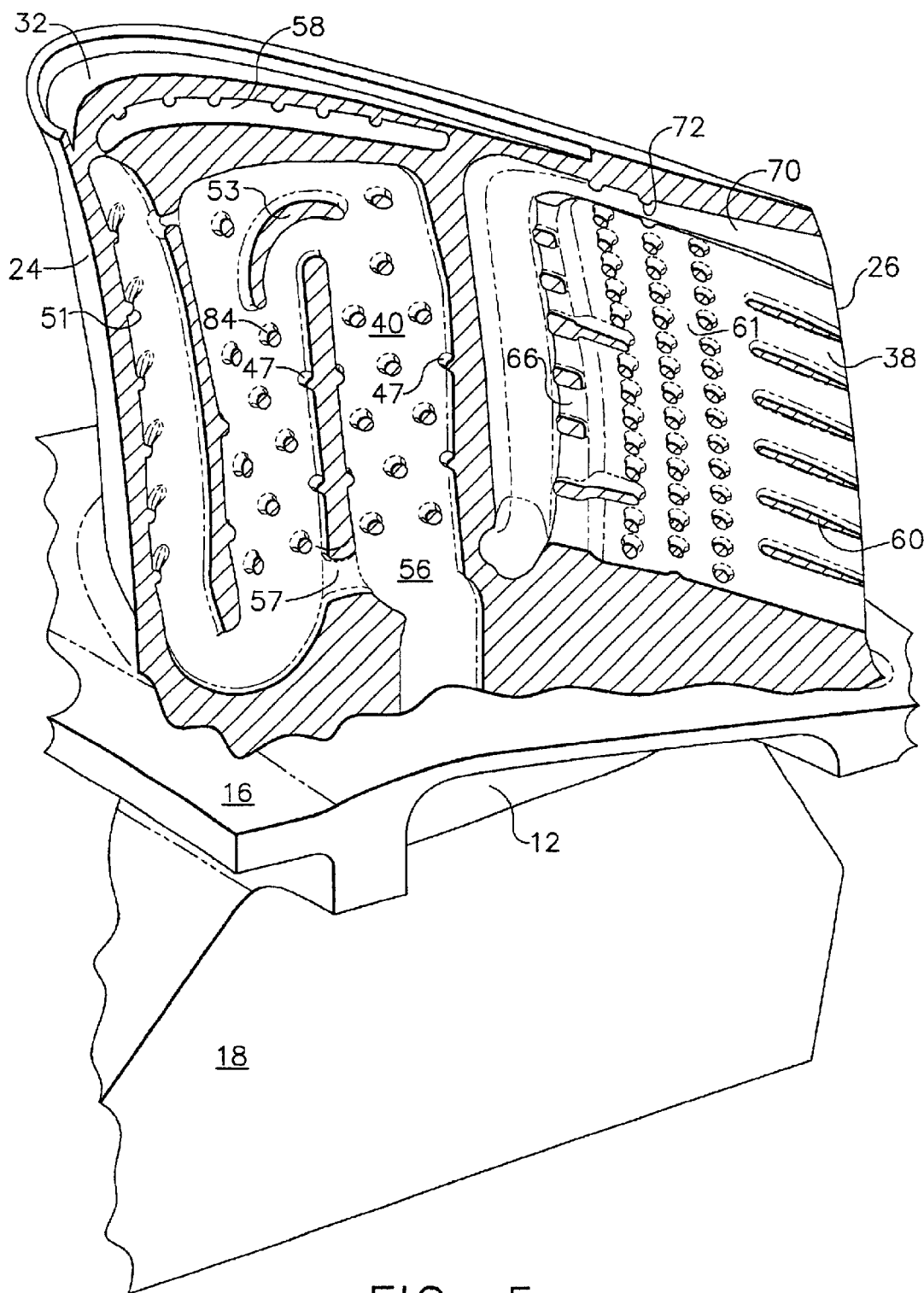
FIG. 5 is an enlarged cutaway perspective view similar in direction to that of FIG. 1.
Figure 6:
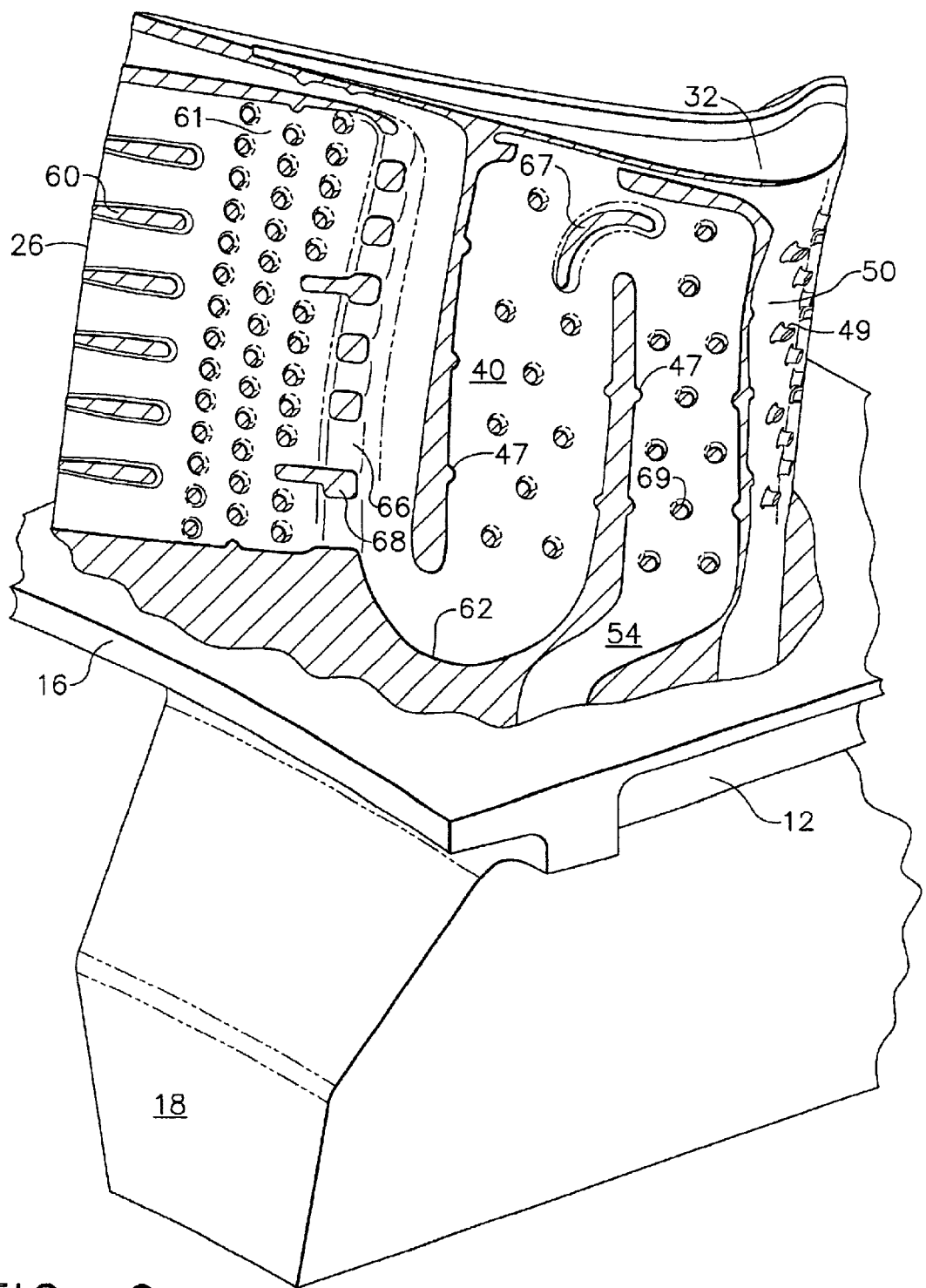
FIG. 6 is an enlarged cutaway perspective view similar in direction to that of FIG. 2.

FIGS. 4, 5 and 6 provide respective views into the internal cooling circuits 40 of the blade airfoil 14. In this specific embodiment, there are four distinct flow circuits each connected to a respective inlet extending through blade root 18, platform 16, and shank 12.

Figure 7:
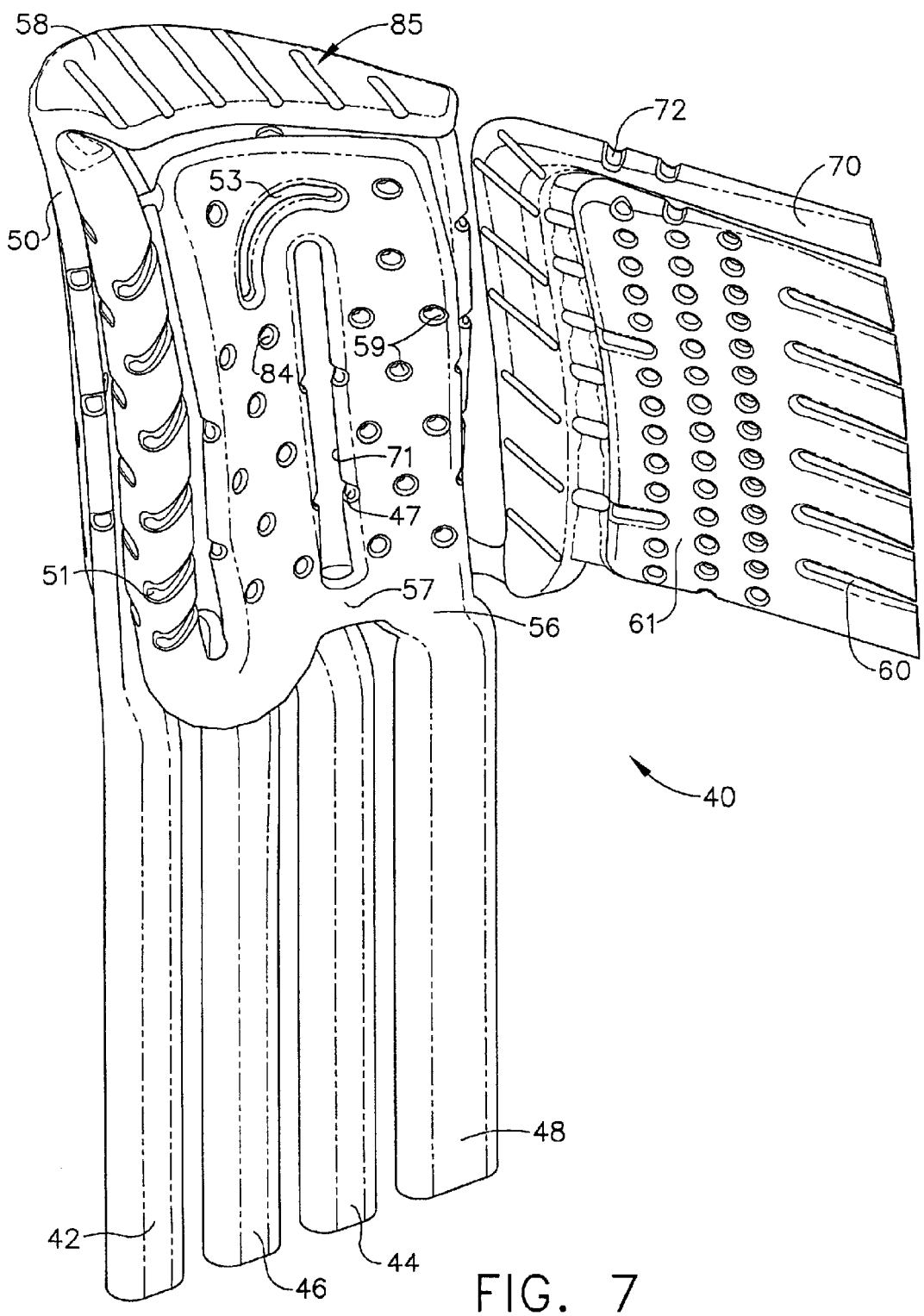
FIG. 7 is a detailed pressure side view of the cooling circuits.
Figure 8:
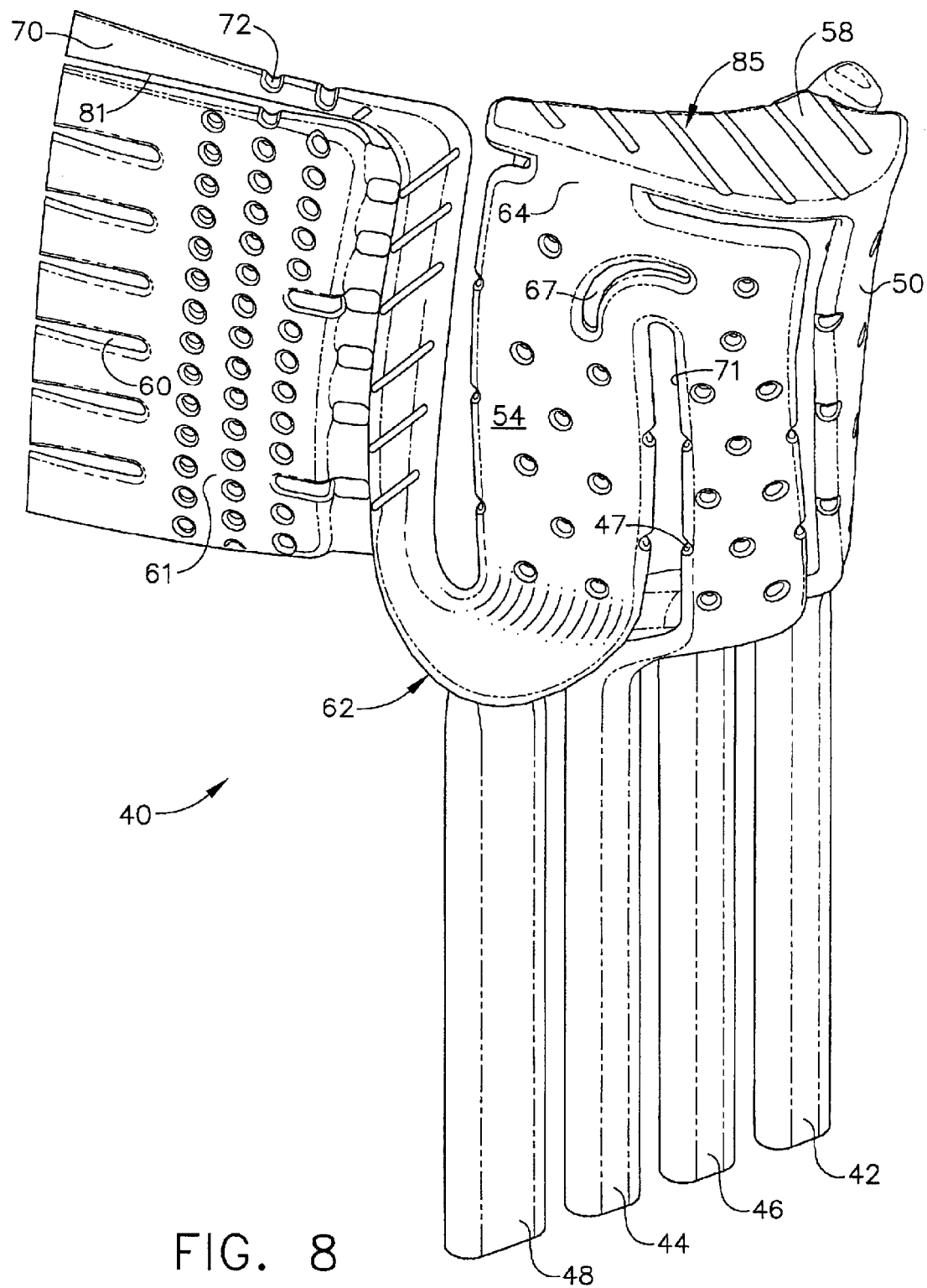
FIG. 8 is a detailed suction side view of the cooling circuits.
Figure 9:
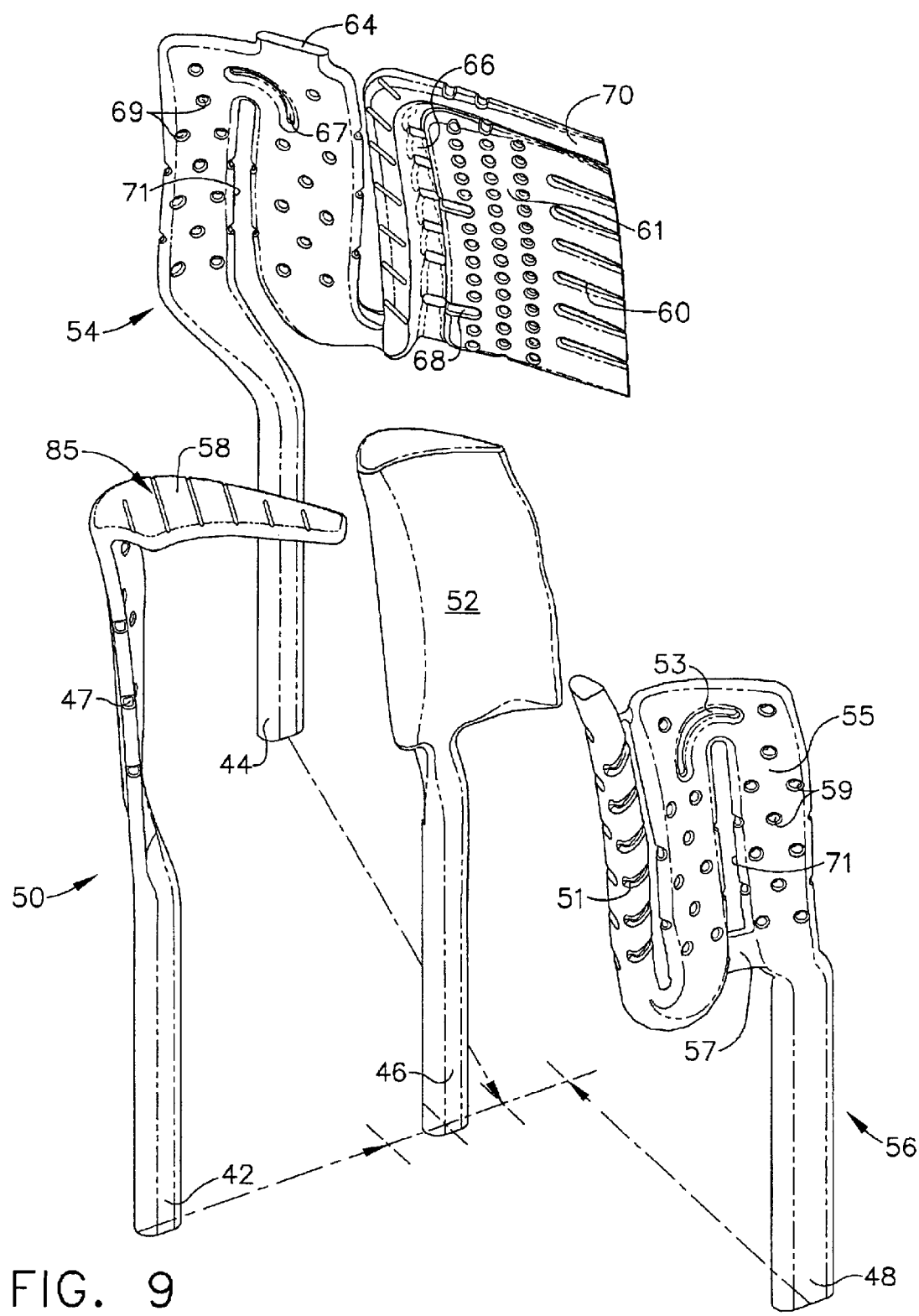
FIG. 9 is a pressure side exploded view of the cooling circuits of the invention.
Figure 10:
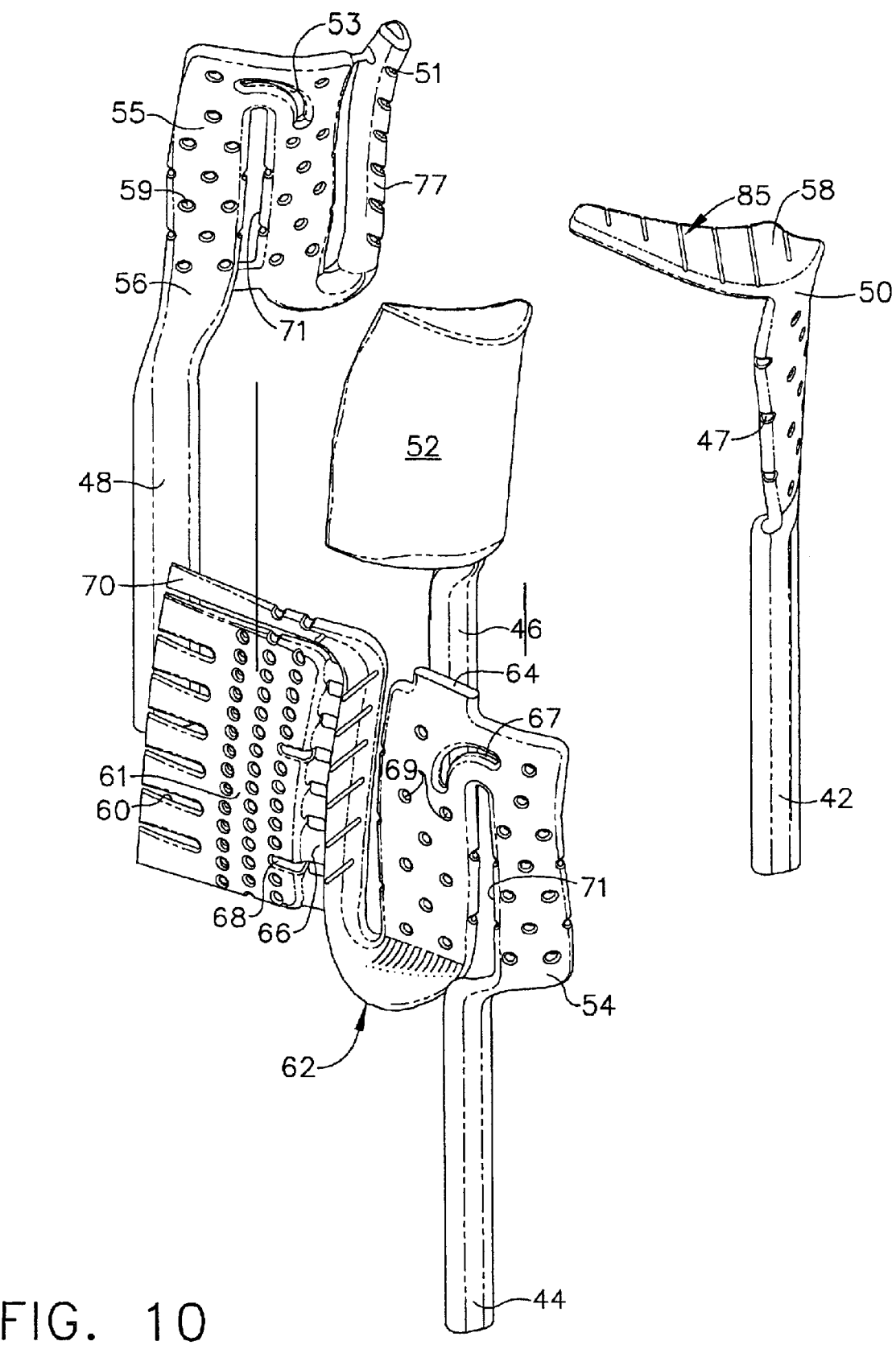
FIG. 10 is a suction side exploded view of the cooling circuits of the invention.
Figure 11:
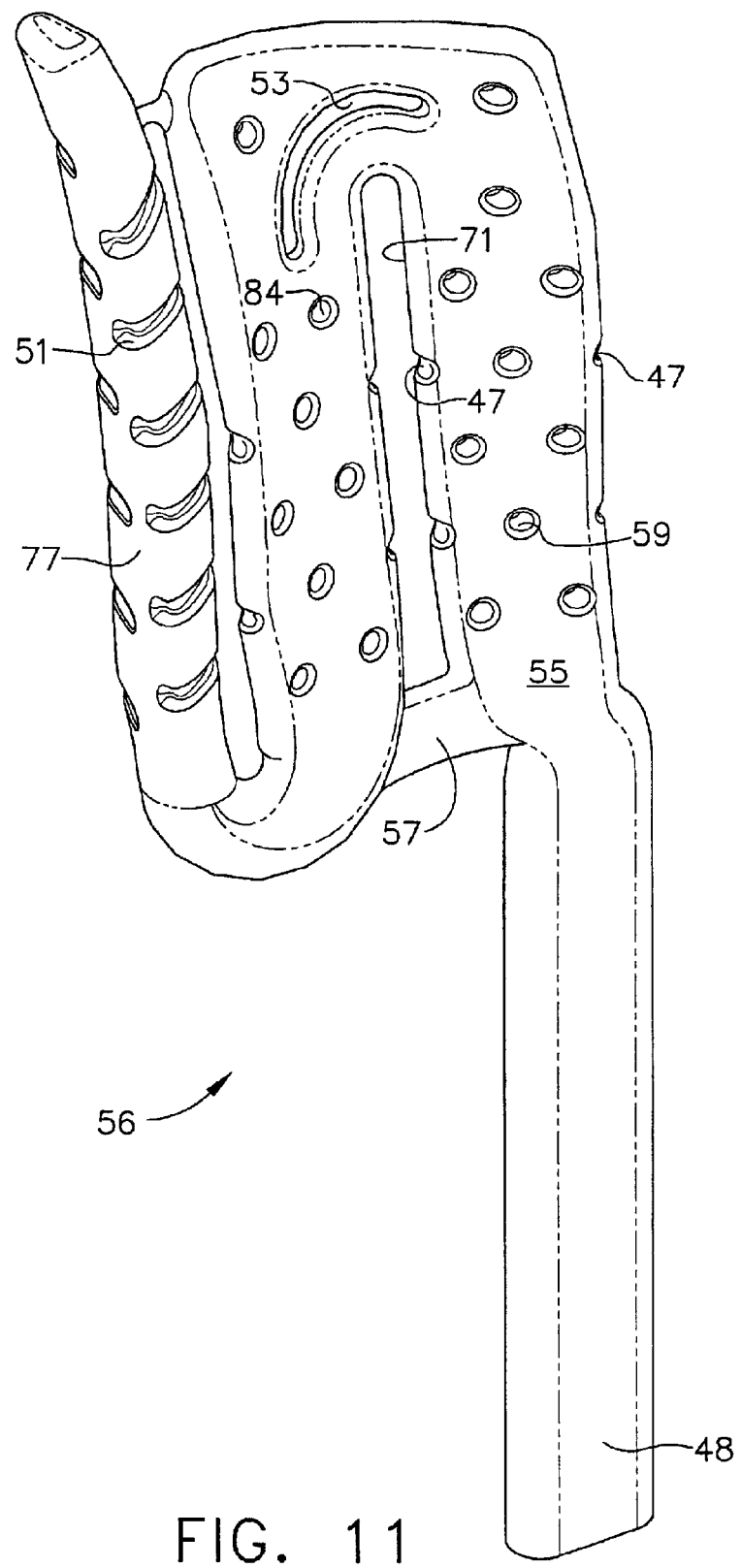
FIG. 11 is a pressure side view of the pressure side individual cooling circuit.
Figure 12:
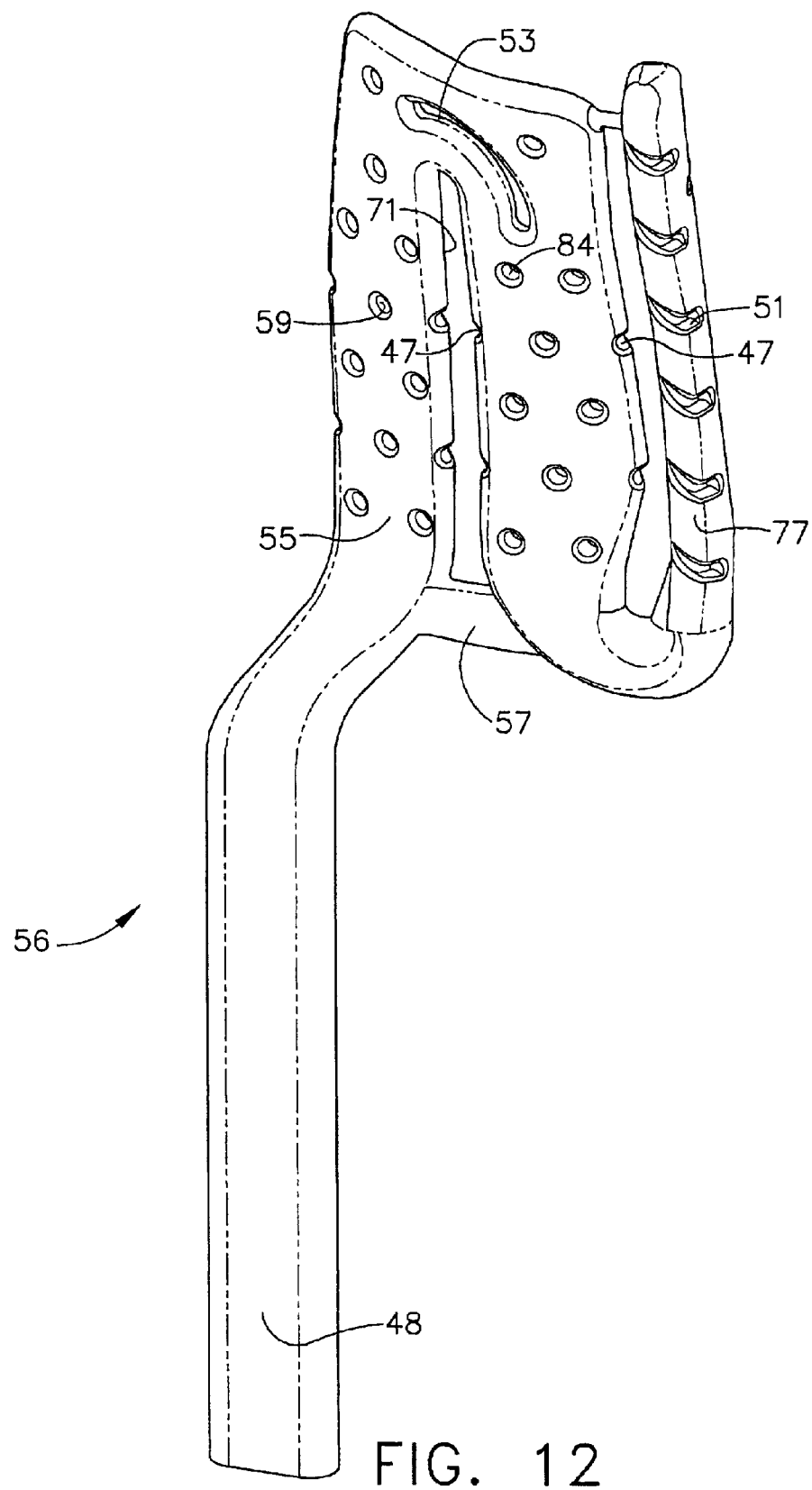
FIG. 12 is a suction side view of the pressure side individual cooling circuit.
Figure 13:
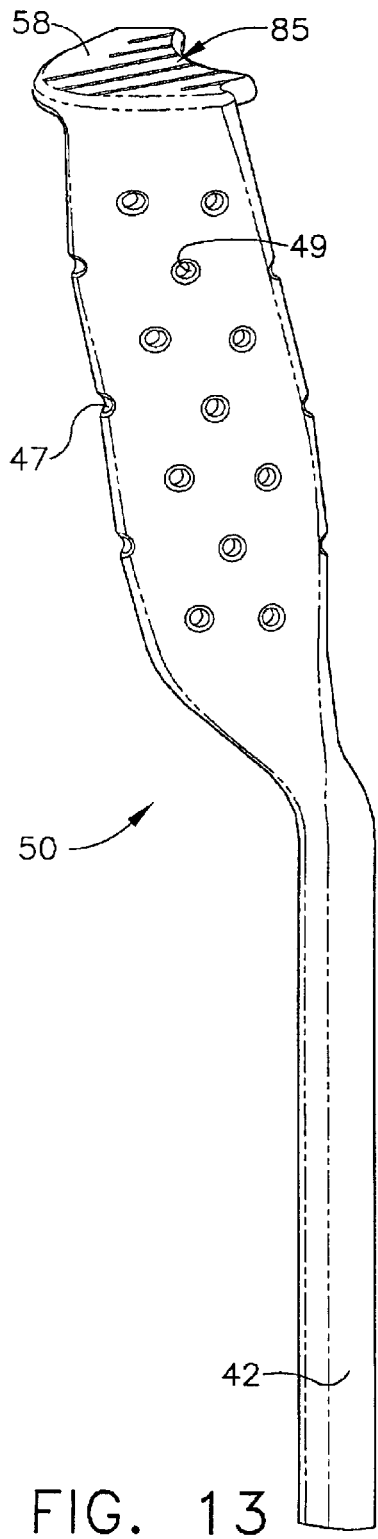
FIG. 13 is a suction side view of the suction side forward and tip plenum individual cooling circuit.
Figure 14:
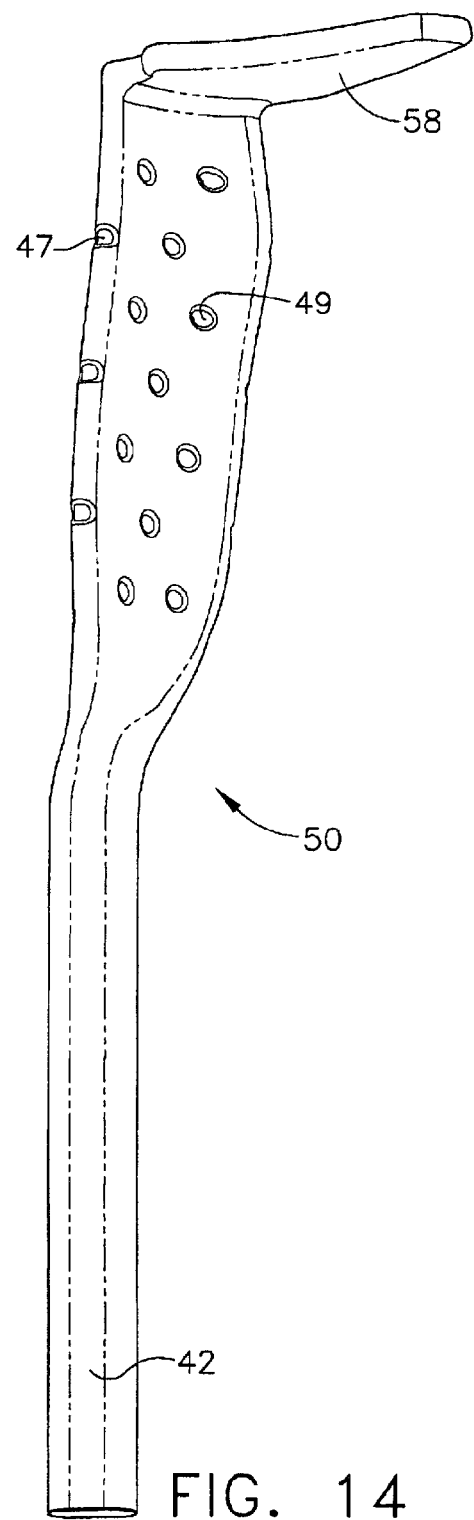
FIG. 14 is a pressure side view of the suction side forward and tip plenum individual cooling circuit.

Unlike other multi-walled designs (such as that disclosed in U.S. Pat. No. 5,626,462 described above), this invention utilizes a cooling configuration that is fabricated as a single piece casting using a plurality of individual ceramic cores that are assembled and fastened into a single core. All the flow circuits 40 are embodied in this single assembly which is then used in a conventional wax pattern for processing with a conventional casting fabrication method. The internal cooling passages are shown in the reverse image schematic in FIG. 7 for the pressure (concave) side 20 of the airfoil and in FIG. 8 for the suction (convex) side 22 of the airfoil. Cooling air enters the vane or blade 14 from the bottom and is fed independently through four cooling circuits 42, 44, 46 and 48 shown in FIGS. 7 and 8. The individual circuits 50, 52, 54, and 56 are shown in reverse image in FIGS. 9 through 18. The pressure side flow circuit 56 is shown in FIGS. 11 and 12. The suction side forward and tip plenum 58 flow circuit 50 is shown in FIGS. 13 and 14. The suction side aft flow circuit 54, shown in FIGS. 15 and 16, receives the cooling air from the suction side forward flow circuit exit 64 after it flows across the tip cap plenum 58. The center body circuit 52 forms a hollow center to minimize the blade airfoil weight while maintaining the required metal cross-sectional area for controlling the stress distribution in the airfoil. This center body circuit may use a small amount of cooling flow or no flow at all, depending on the specific design. Utilizing this assembled cooling circuit technique allows the cooling passages to be completely independent or coupled together as the need arises.

Figure 19:
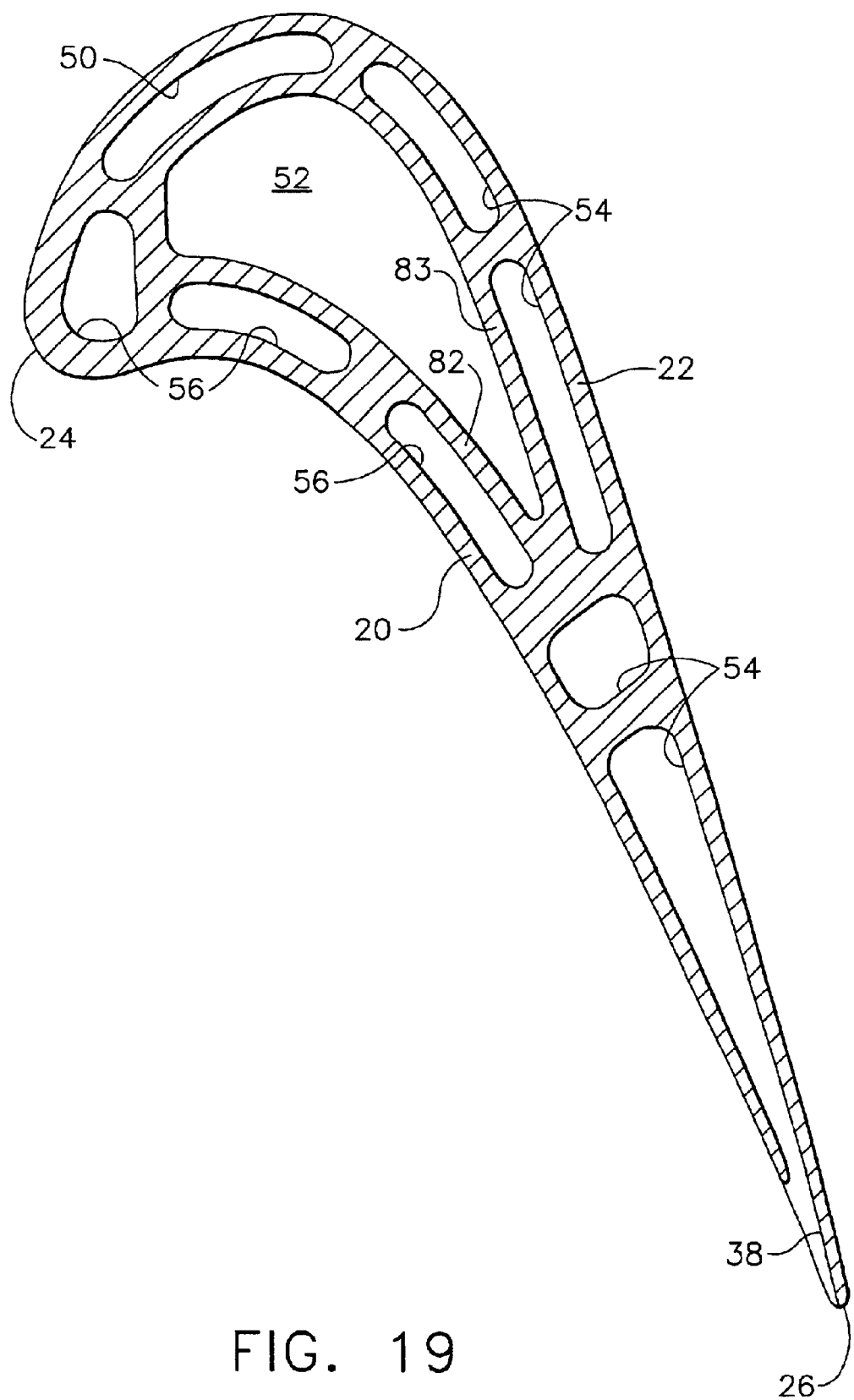
FIG. 19 is a cross-sectional view of the blade of the invention taken along lines 19—19 of FIG. 4, viewed from the top at about 80% radial span.
Figure 20:
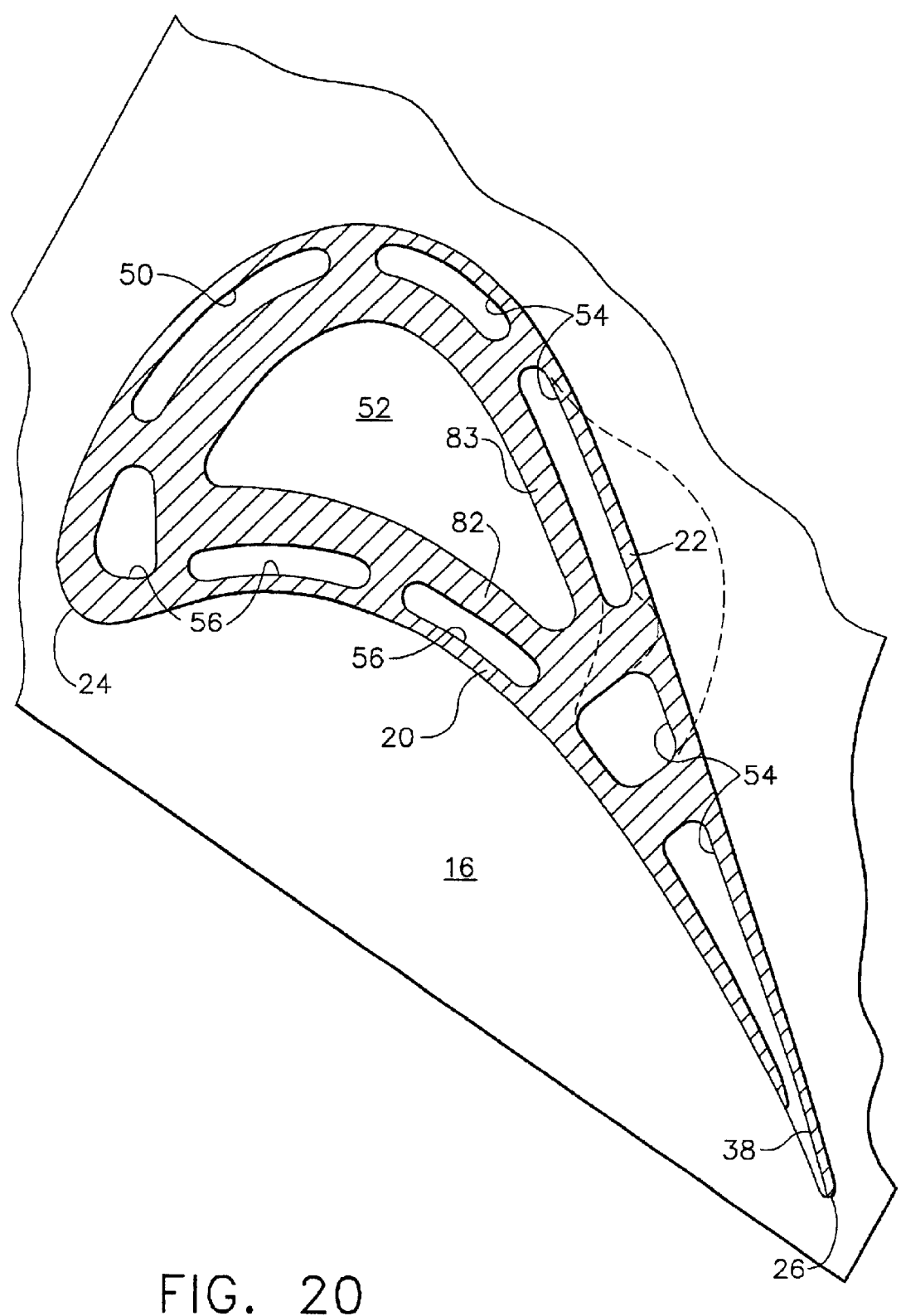
FIG. 20 is a cross-sectional view of the blade of the invention taken along lines 20—20 of FIG. 4, viewed from the top at about 10% radial span.

Turbine vanes and blades in accordance with the prior art, typically utilize much thicker (low aspect ratio) cooling passages (e.g., about 0.5 to 1.5) that are subject to significant Coriolis and buoyancy effects on the internal heat transfer. The inventive blade 10 minimizes these effects by employing thin (high aspect ratio, e.g., about 2 to 10) channels in its multi-pass (e.g., about 1 to 3 passes) serpentine channels. In addition, having multiple walls allows the thicker inner walls (e.g., about 1.5 to 3 times thicker than the outer warmer walls) to remain much cooler (e.g., about 100 to 300° F. cooler) than the thin outer walls (which are about 0.015 to 0.020 inches thick). The thicker, cooler inner walls can carry the majority (e.g., about 1.5 to 5 times more than the thinner outer walls) of the mechanical loads on the blade and thus increase the stress rupture life of the blade. Utilizing pin fins 59 in the outer core cooling passages (as opposed to turbulators or trip-strips) allows a tailored thermal gradient between the cooler inner walls 82 and 83 and hotter outer walls 20 and 22, as shown in FIGS. 19 and 20.

The pressure side cooling circuit 56, shown in FIGS. 11 and 12, is airflow independent of the other flow circuits. Air enters the inlet channel 48 (see FIG. 4) and proceeds radially upwards though a thin serpentine cooling circuit 55 with pin fins 59 and half pin fins 47 to optimize the flow and heat transfer characteristics in the flow circuit. The thickness of the cooling channel can be on the order of about 0.030 inches. Before the airflow reaches the bank of pin fins 59, a portion of the flow can be bled off through an aerodynamically designed super-charger channel 57 which minimizes turning losses as it tangentially draws air into the turn. This super-charger circuit 57 specifically biases cool air to the hot outer wall of the leading edge 24 of the airfoil and greatly improves the back-flow margin of the blade (i.e., the ratio of inside pressure to outside pressure, which is a measure of propensity to ingest hot flow-path gases inside the turbine blade). The cross over channel is unique in that it provides a second flow circuit supplying cooling air to the forward feed channel 77. This further charges the pressure in this circuit to maintain the forward circuit backflow margin.

An advantageous feature of the pressure side cooling circuit 56 is the specific combination placement of pin fins 59 and a turning vane 53 in the serpentine passage 55. The pins and turning vanes are placed to spread the flow of air through the circuit in such a way as to prevent separation of the air from the sidewalls. This maximizes the cooling effectiveness of the flow circuit while minimizing the corresponding pressure drop associated with separated and re-circulation regions. The classic separation zone downstream of the turning vane 53 along the cavity dividing rib 71 has been reduced by 75% by placement of the pin fins 59 to strategically re-direct the flow back to the cavity dividing rib 71. The separation zone along the cavity dividing rib 71 was minimized by utilizing 3-D computational fluid dynamics (CFD) modeling of the passage. It was found that by angling the downstream side trailing edge of the turning vane 53 by 10 degrees back towards the cavity dividing rib 71, and by biasing the placement of the first pin fin downstream of the turning vane 84 towards the center of the cavity (away from the cavity dividing rib 71) by 60% of the pin diameter, the flow was forced to move back towards the cavity dividing rib, which thus minimized the separation zone associated with the 180 degree turning of the cooling air around the serpentine bend. This has been confirmed with both 3-D CFD modeling and with heat transfer testing in the laboratory. This specific combination of turning vane 53 exit angle and pin fin 84 placement reduces the pressure losses associated with the separation zone downstream of the turning vane along the flow dividing rib 71 and results in improved heat transfer in the cavity. Air flows through the cooling circuit 56 to a leading edge turbulated passage 77 with turbulators 51 and exits through conventional film cooling holes, which penetrate the outer wall 20 or 22 of the airfoil in the airfoil leading edge region 24 and are angled relative to the surface to lay down a film of air on the external surface of the airfoil for the purpose of cooling the airfoil during engine operation.

The suction side forward cooling circuit 50, shown in FIGS. 13 and 14, draws its cooling air from the inlet channel 42 and utilizes both full pin fins 49 and half pin fins 47 to optimize the flow and heat transfer characteristics in the flow circuit. Unlike the prior art radial circuits which either expel the spent air out of the blade tip or though a tip flag out of the trailing edge, the inventive blade 10 utilizes a flow circuit which allows the spent air to cool the tip 32 of the blade 10 and then join joint 64 to cool the remaining aft portions 54 of the blade 10, thus improving the thermal effectiveness of the blade. This recycling of the spent air by merging the two flow circuits, allows for optimization of the aft cooling passage 54 thermal profile and effectiveness and reduces the required blade flow by 25%, since additional cooling flow would be required to cool the blade trailing edge 26 if the spent air were not recycled. A combination of conventional turbulators (trip-strips) and core thickness distributions in the blade tip plenum 58 are used to optimize the blade tip heat transfer. Turbulators (trip-strips), like those used in the tip plenum outer wall 85, are longitudinal raised bumps on the inner surface of the cooling passage with the purpose of causing the air flow inside the vane or blade to separate and create high heat transfer for cooling the airfoil wall. This invention is more advantageous than the prior art, which typically uses serpentine turns to cool the tip region of the blade. These serpentine turns can have significant recirculation zones with low heat transfer. The inventive blade suction side forward flow circuit 50 provides a quasi-independent flow circuit that is effectively a direct feed of air to cool the tip cap region 32 of the blade. After cooling the tip cap region 32, the spent air is then used to minimize the serpentine losses as it joins joint 64 with the suction side aft cooling circuit 54 to aid in cooling the trailing edge regions of the blade.

Figure 15:
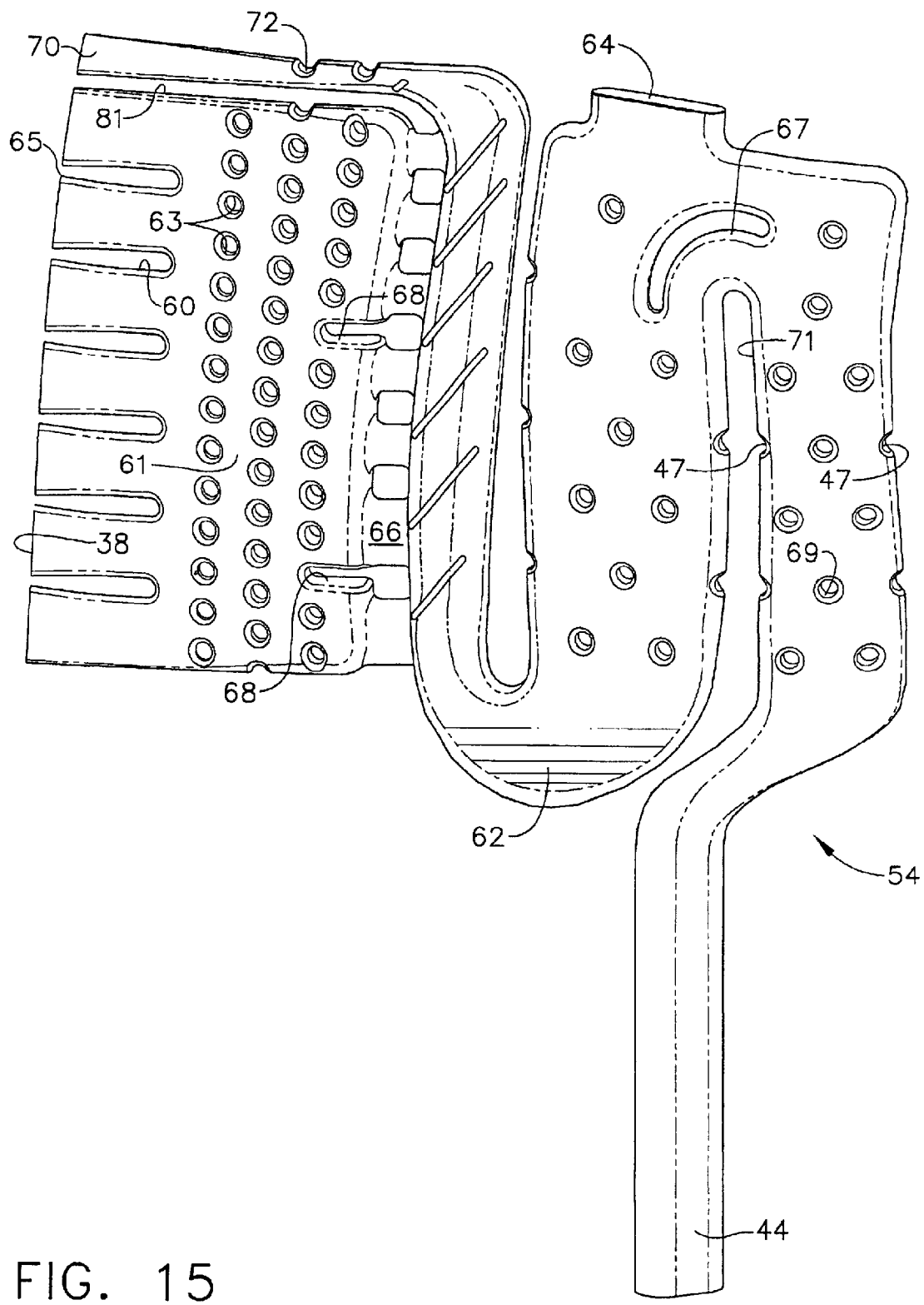
FIG. 15 is a suction side view of a suction side aft, trailing edge, and tip flag cooling circuit.
Figure 16:
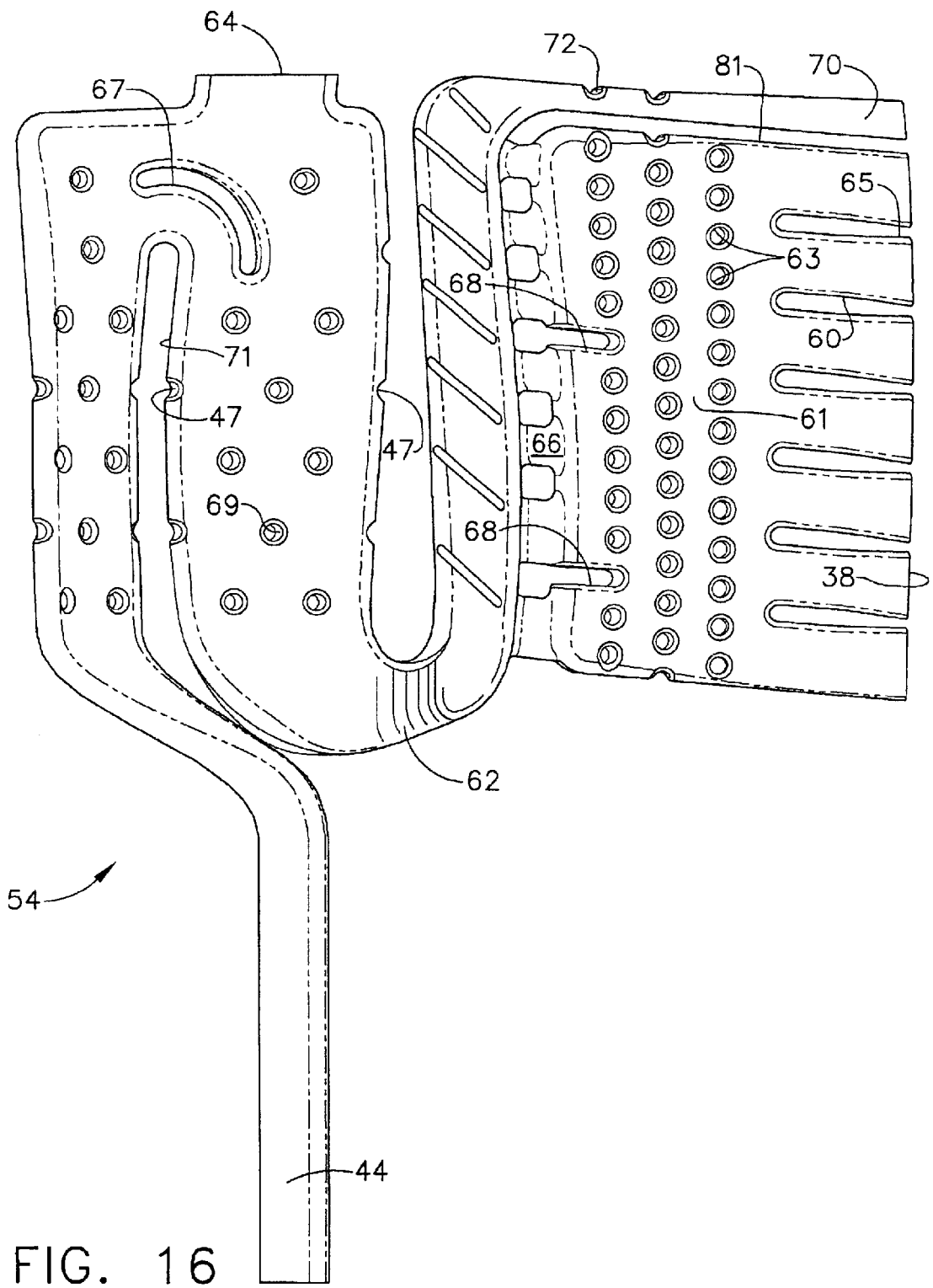
FIG. 16 is a pressure side view of a suction side aft, trailing edge, and tip flag cooling circuit.
Figure 17:
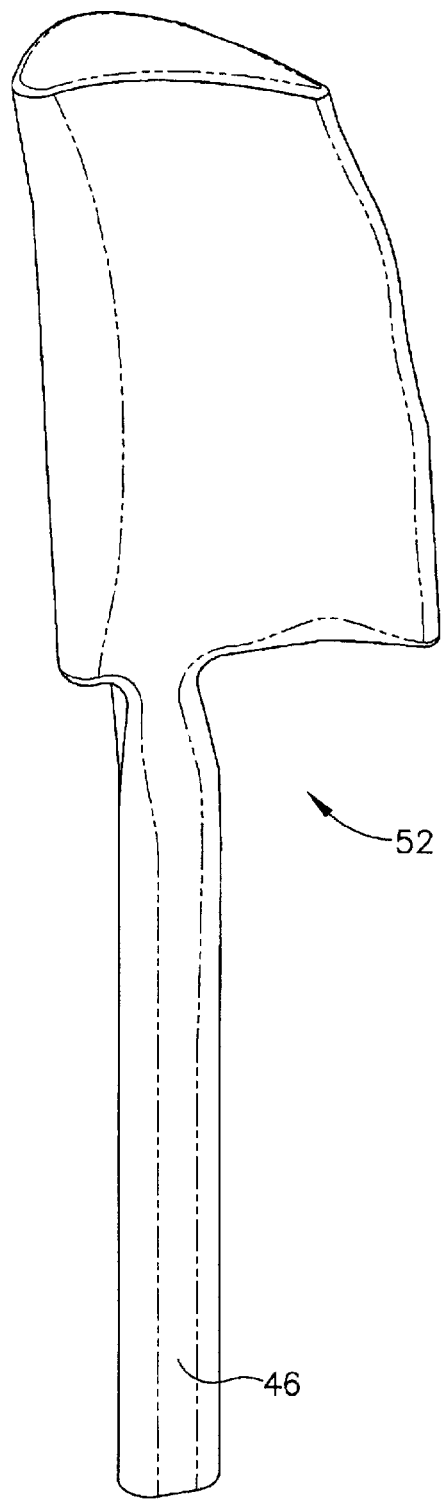
FIG. 17 is a pressure side view of a center body cooling circuit.
Figure 18:
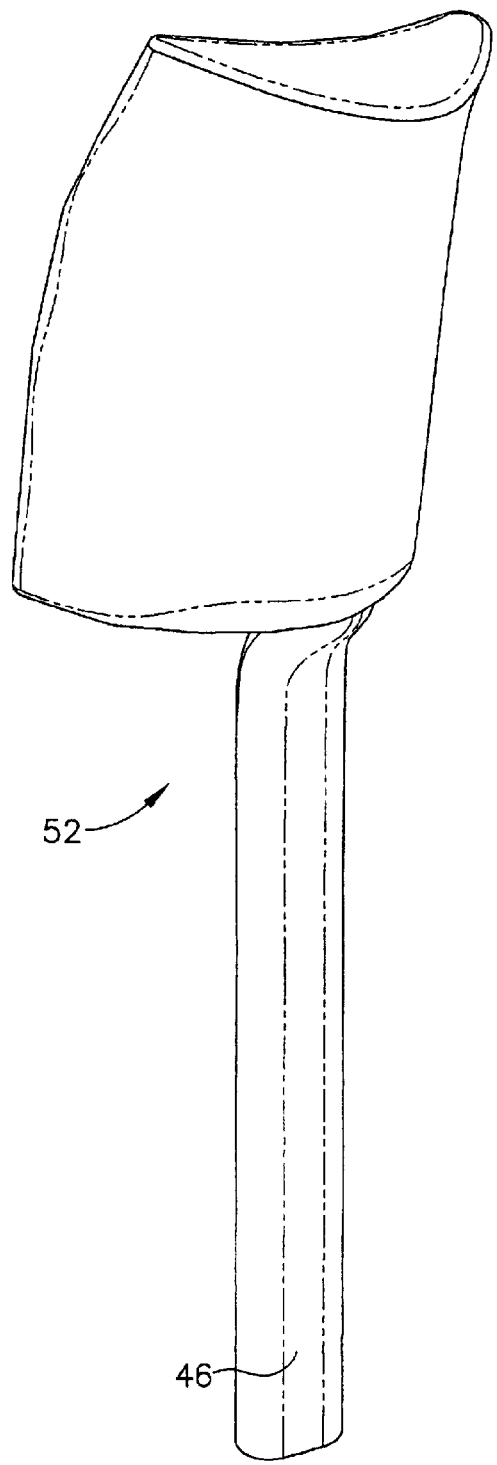
FIG. 18 is a suction side view of a center body cooling circuit.

The suction side aft cooing circuit 54, shown in FIGS. 15 and 16, derives its feed air from the inlet channel 44. It utilizes many of the features of the pressure side circuit 56, including pin fins 69, half pins 47, and turning vane 67 with pin fin optimization for pressure drop and heat transfer. Unlike the prior art serpentine turns, the inventive blade thin outer core aspect ratio construction allows a unique aft serpentine bend 62 optimization at the hub of the blade. The transition from the high aspect ratio (i.e., about 8 to 1) outer core to a conventional aspect ratio (i.e., about 1 to 1) core with continuing convergence in the flow area, in conjunction with the out of planar turning that reduces the need to bring the air radially inboard, reduces the flow field pressure losses by a factor of two, as confirmed by laboratory test data. This innovative feature of the inventive blade, which uses pin fins 69 across the entire flow channel (instead of turbulators located along the walls) and which utilizes out of planar turning 62 (instead of the traditional in-plane serpentine U-turn), effectively suppresses the secondary flow losses associated with traditional turnarounds of the prior art.

The aft serpentine circuit 54 utilizes conventional crossover holes 66 to supply air to a pin fin bank 61, which then exits the spent air out of the trailing edge 26 of the airfoil. The air which does not flow through the crossover holes 66 (and pin bank 61) exits via a uniquely turbulated trailing edge tip flag 70. Conventional tip flags have turbulators that induce turbulence on the suction and pressure walls of the airfoil. Tip flag 70 is unique because this invention employs tip strip turbulators 72 on the top wall adjacent to the airfoil tip cap 32 aft region. With this configuration, the cooling of the tip flag region is enhanced by a factor of two on the top wall, while the pressure and suction sides of the airfoil are cooled both by convection to the tip flag cooling air and by conduction from the lower wall 81 which divides the pin fin bank 61 from the tip flag cavity 70.

Several pin fin bank features are employed which also make the inventive blade more advantageous than the prior art. Straightening vanes 68 impede the tendency of the air to initially pass vertically between pin rows. This improves the airflow distribution in the pin bank 61, reduces flow separation, and minimizes low heat transfer regions caused by recirculation zones. The pin bank 61 is designed such that exactly two pin fins 63 are positioned between the trailing edge teardrops 60 and 65 which form the trailing edge slot exit flow dividers. This invention results in counter rotating canceling vortices at the exit of the pin bank. This produces a more uniform flow field than a "non-paired" pin distribution. These vortex pairs result in a higher total pressure distribution for the exiting flow at the exit slot 38 and a higher film effectiveness on the trailing edge slot 38, thus improving the temperature distribution at the hot trailing edge 26 of the blade airfoil 14.

FIGS. 19 and 20 illustrate in cross-sectional views the relative wall thickness of the blade's exterior and interior structures and the location of the various cooling circuits relative to the exterior walls 20 and 22, to the internal walls 82 and 83, and to the leading and trailing edges 24 and 26. FIG. 19 is a cross-sectional view taken near the blade tip 32 at about 80% radial span. FIG. 20 is a cross-sectional view taken near the blade root 34 at about 10% radial span. It will be understood by those familiar with the turbine blade art, that the relative wall thicknesses make for a robust, multiple-walled, multi-pass, high cooling effectiveness, cooled turbine vane or blade designed for ease of manufacture which can be cast as a single piece using conventional casting methods.

It will now be understood that a unique and highly advantageous cooled turbine blade has been disclosed by way of an embodiment as an illustration of various patentable features. Those having skill in the relevant art will also understand that a cooled blade may benefit from any of these features without necessarily being configured precisely as the illustrated embodiment.

Thus, the scope of the invention hereof is to be limited only by the appended claims and their equivalents.

We claim:

1. An air-cooled turbine blade, the blade having an airfoil shape defined by a convex suction side wall, a concave pressure side wall, a leading edge, a trailing edge, a root and a tip, the walls, edges, root and tip forming an interior for receiving blade cooling circuits; the turbine blade comprising:
   a plurality of independent cooling circuits within said interior, one of said cooling circuits being positioned to cool said pressure side wall and one other of said cooling circuits being positioned to cool said suction side wall;
   wherein said pressure side wall cooling circuit comprises a serpentine passage having a plurality of pin fins and a turning vane;
   wherein said plurality of cooling circuits comprises two of said cooling circuits positioned to cool said suction side wall, one closer to said leading edge and one closer to said trailing edge; and
   wherein said suction side wall cooling circuit closer to said trailing edge comprises a serpentine portion and a pin bank portion, said pin bank portion having a plurality of tear drop slots forming trailing edge air flow dividers for cooling said trailing edge.

2. The turbine blade recited in claim 1 wherein said plurality of cooling circuits comprises respective individual air inlets.

3. The turbine blade recited in claim 1 wherein said plurality of cooling circuits are mechanically interconnected to one another.

4. The turbine blade recited in claim 1 wherein said plurality of cooling circuits comprises two of said cooling circuits positioned to cool said suction side wall, one closer to the leading edge and one closer to the trailing edge.

5. The turbine blade recited in claim 1 wherein said plurality of cooling circuits comprises a cooling circuit positioned substantially in the center of said interior.

6. The turbine blade recited in claim 1 wherein said suction side cooling circuit closer to the leading edge comprises a plenum positioned adjacent said tip for cooling said tip.

7. The turbine blade recited in claim 1 wherein said pin bank portion comprises a plurality of pin fins, said tear drop slots having two said pin fins between adjacent slots.

8. The turbine blade recited in claim 1 wherein said pin bank portion comprises a trailing edge tip flag having tip strip turbulators positioned adjacent said blade tip.

9. The turbine blade recited in claim 1 wherein said pressure side wall cooling circuit comprises a super charger channel bypassing said serpentine passage.

10. An air-cooled turbine blade, the blade having an airfoil shape defined by a convex suction side wall, a concave pressure side wall, a leading edge, a trailing edge, a root and a tip, the walls, edges, root and tip forming an interior for receiving blade cooling circuits; the turbine blade comprising:
- a plurality of independent cooling circuits within said interior, one of said cooling circuits being positioned to cool said pressure side wall and one other of said cooling circuits being positioned to cool said suction side wall;
- wherein said plurality of cooling circuits are mechanically interconnected to one another; and
- wherein two of said cooling circuits are positioned to cool said suction side wall, one closer to the leading edge and one closer to the trailing edge;
- wherein one of said plurality of cooling circuits is positioned substantially in the center of said interior; and
- wherein said suction side wall cooling circuit closer to said trailing edge comprises a serpentine portion and a pin bank portion, said pin bank portion having a plurality of tear drop slots forming trailing edge air flow dividers for cooling said trailing edge.

11. The turbine blade recited in claim 10 wherein said cooling circuit positioned substantially at the center of said interior comprises walls having a greater thickness than the walls of said pressure side and suction side cooling circuits.

12. The turbine blade recited in claim 10 wherein said pressure side wall cooling circuit comprises a serpentine passage having a plurality of pin fins and a turning vane.

13. The turbine blade recited in claim 12 wherein said pressure side wall cooling circuit comprises a super charger channel bypassing said serpentine passage.

14. The turbine blade recited in claim 10 wherein said suction side cooling circuit closer to the leading edge comprises a plenum positioned adjacent said tip for cooling said tip.

15. The turbine blade recited in claim 10 wherein said pin bank portion comprises a plurality of pin fins, said tear drop slots having two said pin fins between adjacent slots.

16. The turbine blade recited in claim 10 wherein said pin bank portion comprises a trailing edge tip flag having tip strip turbulators positioned adjacent said blade tip.

17. An air-cooled turbine blade, the blade having an airfoil shape defined by a convex suction side wall, a concave pressure side wall, a leading edge, a trailing edge, a root and a tip, the walls, edges, root and tip forming an interior for receiving blade cooling circuits; the turbine blade comprising:
- a plurality of independent cooling circuits within said interior, one of said cooling circuits being positioned to cool said pressure side wall and one other of said cooling circuits being positioned to cool said suction side wall;
- wherein said plurality of cooling circuits are mechanically interconnected to one another; and
- wherein two of said cooling circuits are positioned to cool said suction side wall, one closer to the leading edge and one closer to the trailing edge;
- wherein one of said plurality of cooling circuits is positioned substantially in the center of said interior and has walls having a greater thickness than the walls of said pressure side and suction side cooling circuits;
- said pressure side wall cooling circuit having a serpentine passage, said passage having a plurality of pin fins and a turning vane;
- said suction side cooling circuit closer to the leading edge having a plenum positioned adjacent said tip for cooling said tip;
- said suction side wall cooling circuit closer to said trailing edge having a serpentine portion and a pin bank portion, said pin bank portion having a plurality of tear drop slots forming trailing edge air flow dividers for cooling said trailing edge.

18. The turbine blade recited in claim 17 wherein said pin bank comprises a plurality of pin fins, said tear drop slots having two said pin fins between adjacent slots.

19. The turbine blade recited in claim 17 wherein said pin bank portion comprises a trailing edge tip flag having tip strip tubulators positioned adjacent said blade tip.

20. The turbine blade recited in claim 17 wherein said pressure side wall cooling circuit comprises a super charger channel bypassing said serpentine passage.

21. A method for improving the cooling effectiveness of an air-cooled turbine blade, the blade having an airfoil shape defined by a convex suction side wall, a concave pressure side wall, a leading edge, a trailing edge, a root and a tip, the walls, edges, root and tip forming an interior for receiving blade cooling circuits; the method comprising the steps of:
- providing a plurality of independent cooling circuits within said interior;
- positioning one of said cooling circuits substantially in the center of the interior;
- providing said center-positioned cooling circuit with thicker walls than the walls of the remaining cooling circuits;
- injecting cooling air into each said cooling circuit through respective independent air inlets;
- positioning one of said cooling circuits adjacent said leading edge;
- forming said leading edge adjacent said cooling circuit to have a plenum positioned for cooling said tip; and
- reusing cooling air after it cools said plenum.

22. The method recited in claim 21 further comprising the steps of:
- positioning one of said cooling circuits adjacent said suction side wall; and
- positioning one of said cooling circuits adjacent said pressure sidewall.

23. The method recited in claim 22 further comprising the step of:
- forming said pressure side adjacent cooling circuit with a serpentine passage having a plurality of pins and turning vane.

24. The method recited in claim 23 further comprising the step of optimizing the configuration of said plurality of pins to maximize heat transfer and optimizing the configuration of said turning vane to minimize flow separation.

25. The method recited in claim 22 further comprising the step of forming said suction side adjacent said cooling circuit to have an out of plane serpentine bend.

26. An air-cooled turbine blade, the blade having an airfoil shape defined by a convex suction side wall, a concave pressure side wall, a leading edge, a trailing edge, a root and a tip, with the walls, edges, root and tip forming an interior for receiving blade cooling circuits; the turbine blade comprising:
- a plurality of independent cooling circuits within said interior, a first of said cooling circuits being positioned to cool said pressure side wall, a second of said cooling circuits being positioned to cool said suction side wall, and a third of said cooling circuits positioned substantially in the center of said interior;
- wherein said cooling circuit positioned substantially at the center of said interior comprises walls having a greater thickness than the walls of said pressure side and suction side cooling circuits;

wherein said plurality of cooling circuits comprises two of said cooling circuits positioned to cool said suction side wall, one closer to said leading edge and one closer to said trailing edge; and wherein said suction side wall cooling circuit closer to said trailing edge comprises a serpentine portion and a pin bank portion, said pin bank portion having a plurality of tear drop slots forming trailing edge air flow dividers for cooling said trailing edge.

27. The turbine blade recited in claim 26 wherin said plurality of cooling circuits comprises respective individual air inlets.

28. The turbine blade recited in claim 26 wherein said plurality of cooling circuits are mechanically interconnected to one another.

29. The turbine blade recited in claim 26 wherein said pressure side wall cooling circuit comprises a serpentine passage having a plurality of pin fins and one turning vane.

30. The turbine blade recited in claim 29 wherein said pressure side wall cooling circuit comprises a super charger channel bypassing said serpentine passage.

31. The turbine blade recited in claim 26 wherein said suction side cooling circuit closer to the leading edge comprises a plenum positioned adjacent said tip for cooling said tip.

32. The turbine blade recited in claim 26 wherein said pin bank portion comprises a plurality of pin fins, said tear drop slots having two said pin fins between adjacent slots.

33. The turbine blade recited in claim 26 wherein said pin bank portion comprises a trailing edge tip flag having tip strip turbulators positioned adjacent said blade tip.

34. A method for improving the cooling effectiveness of an air-cooled turbine blade, the blade having an airfoil shape defined by a convex suction side wall, a concave pressure side wall, a leading edge, a trailing edge, a root and a tip, the walls, edges, root and tip forming an interior for receiving blade cooling circuits; the method comprising the steps of:

providing a plurality of independent cooling circuits within said interior;

wherein one of said cooling circuits comprises a serpentine passage having a plurality of pins and a turning vane; and injecting cooling air into each said cooling circuit through respective independent air inlets;

positioning one of said cooling circuits adjacent said leading edge;

forming said leading edge adjacent said cooling circuit to have a plenum positioned for cooling said tip; and reusing cooling air after it cools said plenum.

35. The method recited in claim 34 further comprising the steps of:

positioning one of said cooling circuits adjacent said suction side wall; and positioning one of said cooling circuits adjacent said pressure side wall.

36. The method recited in claim 35 further comprising the step of:

forming said pressure side adjacent cooling circuit with a serpentine passage having a plurality of pins and a turning vane.

37. The method recited in claim 35 further comprising the step of forming said suction side adjacent cooling circuit to have an out of plane serpentine bend.

38. The method recited in claim 34 further comprising the step of:

positioning one of said cooling circuits substantially in the center of said interior.

39. The turbine blade recited in claim 34 wherein said pressure side wall cooling circuit comprises a super charger channel bypassing said serpentine passage.

* * * * *